G. H. HAMILTON.
PROCESS FOR SAVING GOLD FROM SAND.
APPLICATION FILED OCT. 18, 1912.

1,104,112.

Patented July 21, 1914.

UNITED STATES PATENT OFFICE.

GEROME H. HAMILTON, OF OREGON CITY, OREGON.

PROCESS FOR SAVING GOLD FROM SAND.

1,104,112.  Specification of Letters Patent. Patented July 21, 1914.

Application filed October 18, 1912. Serial No. 726,508.

*To all whom it may concern:*

Be it known that I, GEROME H. HAMILTON, a citizen of the United States, residing in the city of Oregon City, Clackamas county, Oregon, have invented certain new and useful Improvements in Processes for Saving Gold from Sands, of which the following is a specification.

My invention relates to a process for saving gold from sands, whereby I am able to extract and save finely powdered gold and other precious metals from black sand and the like. I accomplish this by first passing the sand or other matter through or over a drying apparatus of any suitable construction, whereby to thoroughly dry it through and through; then passing the dry sand through one or more very fine screens, thereby separating the coarse sand and other matter and discharging it in one place, while the finer matter is sifted or screened through the screens and thence discharged into a still finer screening device covered with very fine bolting cloth, or the like, through which only the very finest powdered gold can be passed.

In order that others may fully understand my invention, I have shown in the accompanying sheet of drawings one practical apparatus for saving the gold, which I will now describe.

Figure 1:
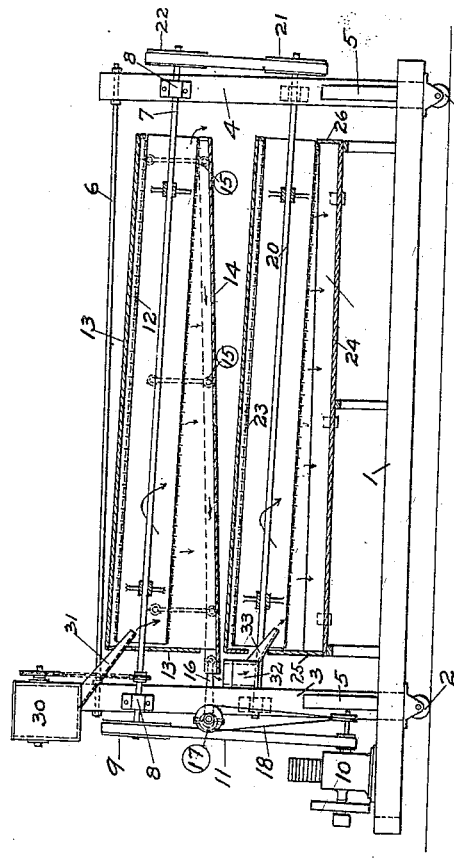
Figure 2:
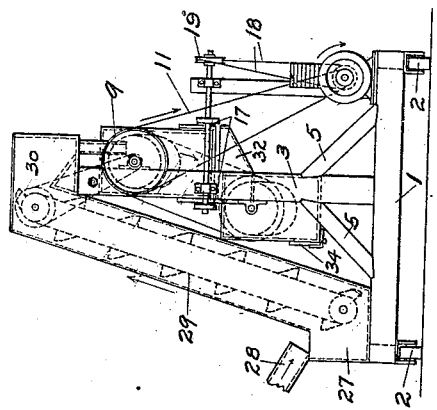

Figure 1 is a side elevation thereof, with parts shown in longitudinal section; Fig. 2 is an end view thereof.

Referring to the drawings, I prefer to mount the apparatus upon a carrying base or floor 1, mounted upon wheels, as 2—2, whereby it is made portable. At opposite ends of said floor or base 1, are upright standards or supporting frames, as 3 and 4, suitably braced, as at 5—5, and with a brace rod, as 6, at the top thereof. Mounted between the upper portions of said standards or supporting frames, in an inclined position, is a shaft 7, rotatably mounted in bearing brackets 8—8, and adapted to be driven by means of a pulley 9, upon one end thereof, which is driven from a motor 10, through a belt connection, as indicated by 11. Mounted upon said shaft 7, to revolve therewith, is a cylindrical screen, as 12, open at both ends, as indicated, and preferably round in cross section, although it is evident that it can be made octagon shape, or even square, in cross section, with very good results. Mounted over said screen 12, is a box or hood 13, with a bottom portion 14 pivotally supported, as at 15—15, in order that it may be oscillated by means of operating arms 16—16, connected thereto at one end and at their opposite ends connected with eccentrics, as 17, driven from the motor 10, by means of a belt 18 and pulley 19. Mounted between the lower portions of said standards 3 and 4, is another shaft 20, driven by means of a pulley 21, mounted thereupon, by a belt from pulley 22 on shaft 7. Mounted upon said shaft 20 and turning therewith, is a cylindrical screening or bolting device 23, open at both ends, as indicated. This device may also be round, square, or octagon, in cross section, and is covered with a very fine quality of bolting cloth, through which only the very finest of powdered gold is passable. I surround this screening device with a box, as 24, closed as much as possible at its ends, as indicated at 25 and 26.

Mounted upon the base or floor 1 is a receiving box, as 27, into which the dry sand is discharged from a drier, as through a spout or pipe 28. From this box 27 is an elevator 29, of well known construction, which lifts the sand by means of its buckets, and discharges it into a box or hopper 30 at the upper end thereof. From this box or hopper 30, the sand is fed through a discharge pipe or tube 31 into the upper end of the screen 12, said screen being mounted in a slightly inclined position. This screen is of very fine mesh and as the sand is discharged thereinto, it is caused to move by reason of the inclined surface and the revolving movement thereof, through the screen longitudinally and out at the opposite end thereof, while the very fine portions thereof pass through the meshes of said screen and into the bottom portion 14 of the box or hopper 13. This bottom portion 14 is also mounted in an inclined position, but inclines in an opposite direction, whereby the sifted or screened material is discharged into the box or hopper 32, from which it is fed, through a pipe 33, into the bolting screen 23, also mounted in an inclined position, as is screen 12 above. As the fine material discharged thereinto is caused to work its way through said screening or bolting device, and out at the opposite end thereof, the finest of the powdered matter, the powdered gold, is beaten or worked through the bolting cloth and into the box 24, from which it can be gathered through suitable doors arranged therein, as at 34, Fig. 2, extending longitudinally of said box. Thus it will be understood, by a continuous process, the black sand is discharged from a drier through spout 28, into the box 27, is lifted into box or hopper 30, from which it passes to and through the upper screen 12, the coarser parts being discharged out of the opposite end of said screen, while the finer parts thereof pass through the screen into the box 13, from which it is discharged into a box 32, by the oscillating bottom 14. From this box 32, the fine matter passes through the pipe 33, into the revolving bolting screen 23, where the finest of the powdered material is worked through the bolting cloth into the box or receptacle 24, while the coarser matter passes on through the screen and out at its opposite end.

It is to be understood, as hereinbefore stated, that my process of getting the gold from black, or other, sands, requires that it be absolutely dry, and I prefer a drier of such construction and arrangement that it can be made a part of the apparatus and moved along therewith so that the sand can be discharged direct from the drier to the separator, thus making possible a continuous process or operation, and making it possible to handle a large amount of sand rapidly.

I am aware that my process can be carried out by other means without departing from the spirit of my invention, and I do not, therefore, limit the invention to the particular embodiment thereof here shown and described for purposes of illustration, except as I may be limited by the hereto appended claim.

I claim:

The herein described process of saving finely powdered gold from sands which consists in thoroughly drying the sand, then passing it through a screening device of fine mesh, and afterward passing the finely screened matter through a bolting device which is being agitated so as to cause the matter to be repeatedly dropped or thrown against fine bolting cloth, whereby to force the finest powdered gold therethrough.

Signed at Portland, Oregon, October 11th, 1912.

GEROME H. HAMILTON.

In presence of—
WARREN P. SMITH,
R. B. FRENCH.